G. E. ELIA.
APPARATUS FOR DETECTING AND INDICATING THE PRESENCE OF SUBMARINE BOATS.
APPLICATION FILED FEB. 3, 1917.
1,320,610.
Patented Nov. 4, 1919.
3 SHEETS—SHEET 1.
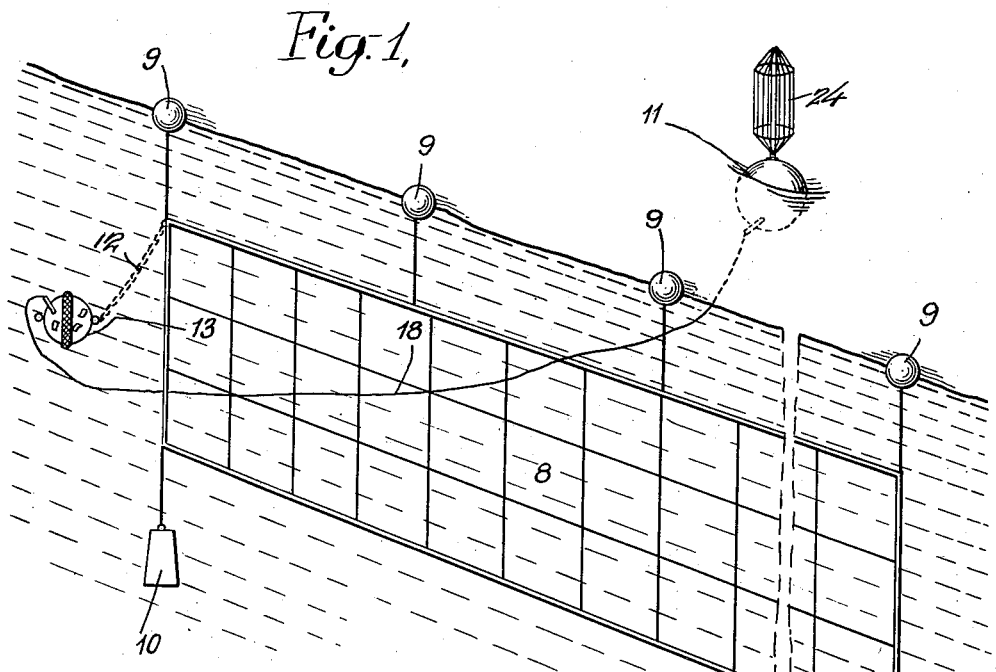
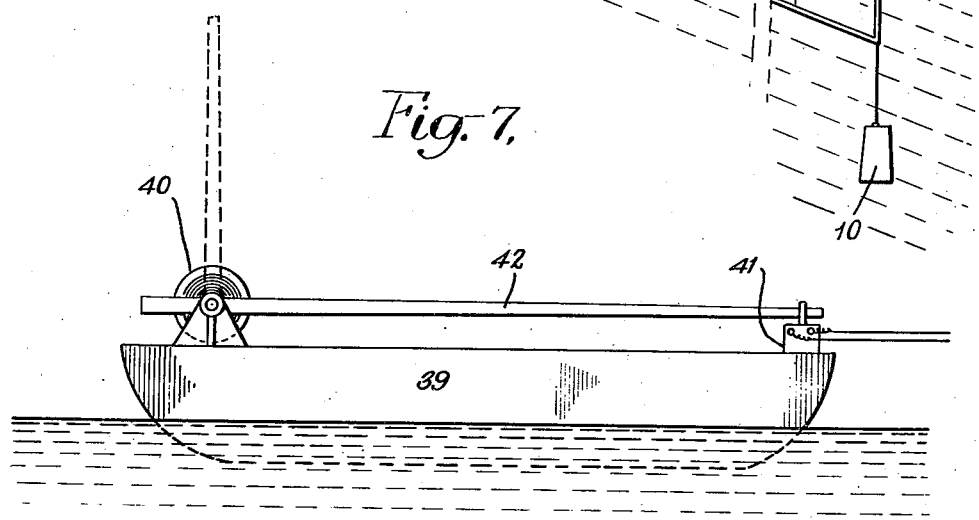
Inventor
GIOVANNI E. ELIA.
By his Attorneys

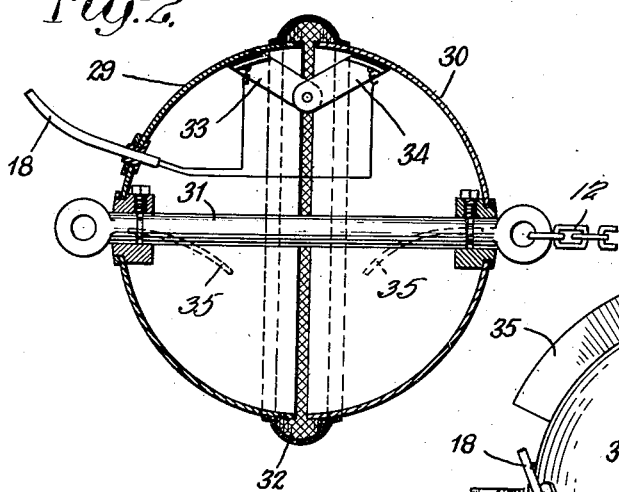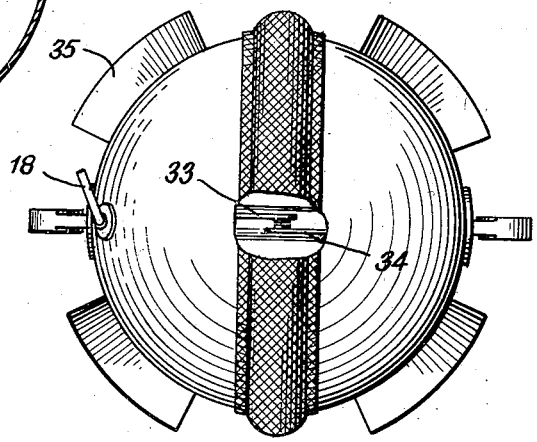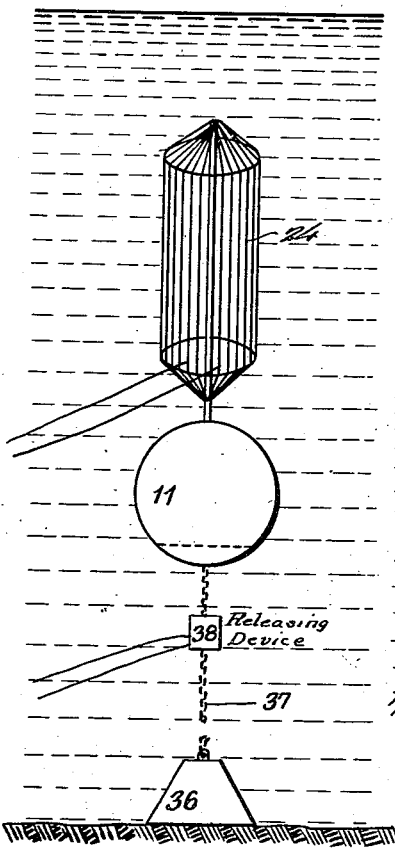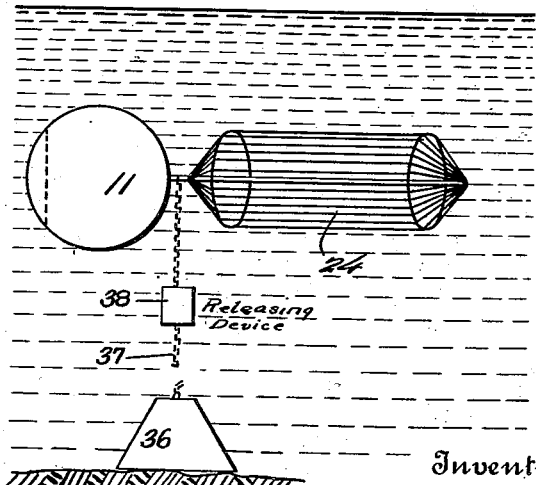

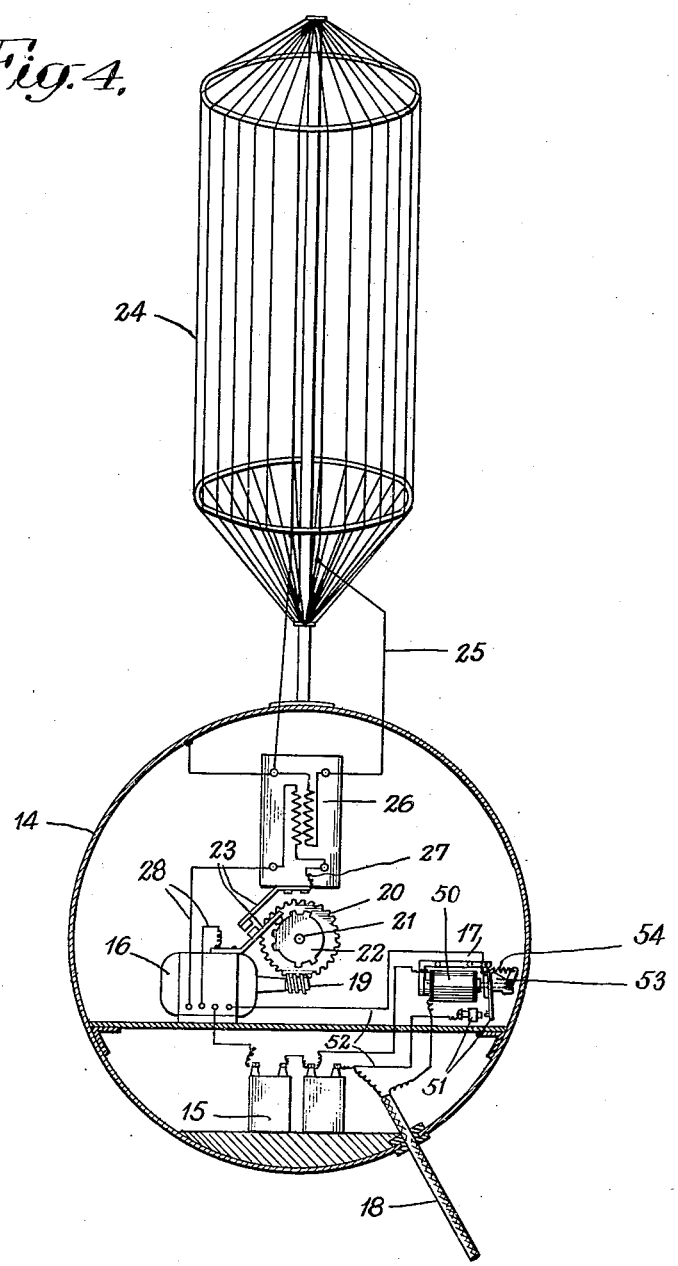

UNITED STATES PATENT OFFICE.

GIOVANNI EMANUELE ELIA, OF NEW YORK, N. Y.

APPARATUS FOR DETECTING AND INDICATING THE PRESENCE OF SUBMARINE BOATS.

1,320,610.  Specification of Letters Patent.  Patented Nov. 4, 1919.

Application filed February 3, 1917. Serial No. 146,340.

*To all whom it may concern:*

Be it known that I, GIOVANNI EMANUELE ELIA, a subject of the King of Italy, residing at the city, county, and State of New York, have invented certain new and useful Improvements in Apparatus for Detecting and Indicating the Presence of Submarine Boats; and I do hereby declare the following to be a full, clear, and exact description of the invention, such as will enable others skilled in the art to which it appertains to make and use the same.

This invention relates to the art of detecting and indicating the presence of submarine boats or other vessels of low visibility. The object of the invention is to provide an improved apparatus which is capable of automatic operation to send to a considerable distance a signal indicating the presence and location of a boat.

In accordance with the invention, wireless telegraphy is employed as the means for transmitting the signals. To this end, a multiplicity of automatic wireless telegraph transmitters are provided in connection with submerged nets and each transmitter has an automatic controlling mechanism associated with it such that the transmitter is released when its net is struck or drawn through the water by being engaged by a moving submarine boat.

In the defense of harbors, channels and the like, it is common to resort to nets of relatively great length which are held submerged at the appropriate depth by being suspended from suitable floats. When a submarine boat encounters such a net, it is important that knowledge of this fact be communicated at once to the forces defending the harbor or channel, for if the submarine were free to maneuver for a considerable period of time, it might succeed in extricating itself from the net. In an application for patent filed by me on December 7th, 1916, and serially numbered 135,675, I have disclosed various means for sending signals indicating the presence of a submarine boat in a net, including submarine bells, flaming torches and the like, these being combined with means for rendering them operative when the net to which they are connected is drawn through the water and in that application I have claimed my invention in broad terms. The present invention involves a utilization of the said invention employing wireless telegraphy as the signal transmitting system. The automatic transmitters employed in the practice of the invention are connected to the submerged nets and each is arranged to send a distinctive signal, so that when a signal is received, the officer in charge of the receiving station will know at once the exact point from which the signal was transmitted. The transmitting apparatus preferably includes a battery, a motor supplied therefrom, an automatic signal transmitter driven by the motor, and a suitable aerial connected in the circuit of the transmitter. The automatic controlling mechanism operates when it is dragged by a nut through the water and it serves to connect the storage battery to the motor and to the transformer, whereupon the motor operates the transmitting circuit interrupter to transmit the signal for which the apparatus was designed.

The construction of the parts employed may be varied within wide limits while still employing the features of the invention. This is particularly true of the aerial which may be mounted on any suitable form of float and arranged to be normally either above or below the surface of the water. Various arrangements of the aerial which may be employed will be hereinafter pointed out.

The invention will be better understood by reference to the following description in connection with the accompanying drawings which show the preferred embodiment of the invention. In these drawings, Figure 1 is a perspective view of a net having the signaling apparatus connected thereto; Fig. 2 is a sectional view of the automatic controller for the transmitter; Fig. 3 is a plan view of the controller, broken away in part; Fig. 4 is a sectional elevation of the transmitter; and Figs. 5, 6 and 7 are views illustrating modified forms in which the transmitter may be embodied.

Referring to these drawings, Fig. 1 shows the net 8 submerged in the sea by being suspended at a suitable depth from buoys 9. Weights 10 may be employed for holding the net relatively taut. It will be understood that the net is of great length. The transmitter for sending out wireless telegraph signals is indicated at 11. It is connected to the net 8 by an electrical cable 18 and a mechanical cable or chain 12. The automatic controller for the transmitter may be combined therewith or separate therefrom as desired; it is here shown separate at 13 and it is connected to the net by means of the chain 12 and to the transmitter by means of the cable 18.

The construction of the transmitter is indicated in Fig. 4. It comprises a watertight casing 14 having a battery 15 of an adequate number of cells therein. The battery supplies electrical energy to the motor of a motor generator set 16 but the circuit to the motor is controlled by a relay 17 whose operation is governed by the automatic controller. The wires from the controller enter the casing 14 through a bushed opening, one of them being connected to the battery and the other to one terminal of the coil 50 of the relay. The other terminal of the coil 50 is connected to the opposite electrode of the first cell of the battery, so that the actuating circuit of the relay includes one cell of the battery, the actuating coil of the relay, the wires in the cable 18 running to the controller and the contacts in the controller. The contacts 51 controlled by the relay 17 are connected by wires 52 to the motor and to one terminal of the battery 15 and the other terminal of the battery is connected to the motor as shown. The shaft of the motor is provided with a worm 19 meshing with a gear 20 on the shaft 21 of a circuit interrupter controller 22. This controller is adapted to actuate signal transmitting contacts 23 connected in a circuit supplying the aerial 24 which is mounted upon the casing 14 extending upwardly therefrom to a considerable height. One terminal of the aerial is connected by a wire 25 to the secondary of a high tension transformer 26, the other terminal of which is connected to the casing 14. The primary of the transformer is connected by a wire 27 to one of the contacts 23. The other contact 23 and the other side of the primary coil of the transformer are connected by wires 28 to the generator of the motor-generator set 16.

The construction which I prefer to employ in the automatic controller 13 is shown in Figs. 2 and 3. It consists of a spherical casing formed of two hemispherical parts which are connected together but are movable relatively. The two hemispherical parts are shown at 29 and 30. They are mounted on a central support 31 upon which they may rotate through a small angle. A band 32 encircles the spherical body and is connected to the parts 29 and 30 so as to preclude the entrance of water between them but permit them to move relatively the requisite amount. On the interior of the parts 29 and 30 are supports 33 and 34 each carrying a contact arranged as shown in Fig. 3 so that when the parts 29 and 30 move relatively these contacts will come into engagement. The cable 18 enters the spherical body as shown and the wires thereof are connected to the contacts on the supports 33 and 34, which contacts are insulated from the parts 29 and 30, as is indicated in Fig. 2. On the exterior of the parts 29 and 30 are a plurality of fins 35 curved as indicated in Fig. 2. The arrangement and shape of these fins is such that when the controlling device is drawn through the water, the latter acts on the fins 35 to cause rotation of the parts 29 and 30 in opposite directions thereby causing engagement of the contacts 33 and 34. It will be noted that the bar 31 is provided with an eye for connection to the chain 12.

The operation of the apparatus will now be described in connection with Figs. 1 to 4. The net 8 is submerged as shown in Fig. 1 and the transmitter and its controlling device are connected to the net. The transmitter may be arranged so as to float upon the surface of the water as indicated in Fig. 1, but the controlling device is preferably submerged to a considerable depth. When a submarine boat engages the net, the latter is dragged through the water carrying with it the controlling device; the connection to the transmitter is preferably of considerable length so as to allow ample slack. As the controlling device is drawn through the water, the latter acts on the fins 35 to close the contacts 33 and 34 as above described, thereby closing the circuit through one cell of battery 15 and the actuating coil of the relay. The relay then operates to close its contacts 51, thereby closing circuit from the battery through the motor of the motor-generator set 16. The operation of the motor-generator drives the circuit interrupter 23 and also supplies current to the primary circuit of the transformer 26 under the control of the interrupter. As the contacts 23 are closed and opened, signal impulses are sent out from the aerial 24 which is connected in the secondary circuit of the transformer. Although this signal transmitting apparatus is of relatively low power, the signal impulses will be transmitted through a distance of many miles, and when picked up at the receiving station, they will serve to inform the officer in charge of that station of the location of the submarine boat, it being understood that the transmitting wheel 22 in each transmitter has a different number or a different arrangement of teeth thereon and that a record is kept of the location of each transmitter and the signal which that transmitter is designed to send.

It may be desirable to guard against detection of the location of the nets 8 by submarine boats or other hostile craft by making the signal transmitting devices less visible or completely invisible until they are brought into operation. Expedients which may be resorted to for this purpose are indicated in Figs. 5, 6 and 7. In Fig. 5, the entire transmitting mechanism including the aerial is normally held in a submerged condition by a weight 36 attached to the transmitter 11. In the connection 37 of the weight to the transmitter is a releasing device 38 operated electrically and connected in the circuit of the automatic controlling device 13 and the relay 17. With this construction, the closure of the circuit of the automatic controlling device so as to start the transmitter in operation, operates to release the weight 36 so that the buoyant transmitting device will rise to the surface and assume a position with the aerial projecting upwardly above the surface of the water.

In Fig. 6, a similar construction is shown except that the weight 36 is attached to the transmitting mechanism at such a point as to hold the aerial in a horizontal position in which it is partially or entirely submerged. On the release of the weight 36 by the releasing device 38, the aerial at once assumes its vertical position.

The buoyant hollow casing 14 of the transmitting mechanisms 11 shown in Figs. 1, 5 and 6 of the drawings is so weighted as to support the aerial in an upright position, when unrestrained. Thus, in the arrangement shown in Fig. 1 of the drawings the buoyant device 11 is so weighted as to support the aerial in an upright position, and in the arrangements illustrated in Figs. 5 and 6 the buoyant devices are so weighted as to support their respective aerials in an upright position when released from their coöperating weights 36.

In Fig. 7, the aerial is mounted in any well known manner upon a mast 42 which is carried upon a float 39 having the general form of a boat. The mast is mounted so as to turn about a horizontal axis and it is urged toward a vertical position by a heavy coiled spring 40. Until the transmitter is to be used to send a signal, it is held in a horizontal position by a retaining device 41 electrically operated to release the mast 42 by the closure of the contacts by the automatic controller whereupon the mast is turned to the upright position by spring 40 and the signal is at once sent out.

It will be understood that the invention is not limited to the features of construction herein illustrated and described; these may be arranged in various ways while still employing the principles of the invention. In particular, the construction and arrangement of the parts of the transmitting apparatus shown in Fig. 4 may be changed in various ways. Also, the construction employed in the relay 17 may be varied as desired. In practice, I prefer to provide a locking means which will serve to hold the armature of the relay in its attracted position after it has been moved to that position. Any suitable means for this purpose may be employed, such as a spring actuated detent which will drop behind the armature when the latter has been attracted. Such a detent is shown at 53 in Fig. 4, actuated by a spring 54 so that when the armature is attracted to close the relay contacts, those contacts will be prevented from being opened.

While I have described my invention as used in detecting and indicating the presence of submarine boats, I wish it understood that the invention is not limited with respect to the field of its utility and particularly that the invention may be employed in detecting all types of vessels, especially those of low visibility, whether or not they are adapted for submarine navigation.

I claim:

1. The combination of a net adapted to be submerged in the sea so as to be engaged and drawn through the water by a moving submarine or other boat, a wireless telegraph signal transmitter adapted to transmit a predetermined signal, and automatic controlling means for the transmitter connected with the net to be actuated automatically consequent upon the movement of the latter through the water to cause operation of the transmitter to send its signal.

2. The combination of a net adapted to be submerged in the sea in position to be engaged by a submarine or other boat, a wireless telegraph signal transmitter including a casing, an aerial mounted thereon and a motor-operated circuit interrupter in the casing connected to the aerial, and automatic controlling means for causing operation of the circuit interrupter when the net is drawn through the water by a submarine boat.

3. The combination of a net adapted to be submerged in position to be engaged by a submarine or other boat, a wireless telegraph signal transmitter including an aerial, an automatic controlling mechanism for causing operation of the transmitter when the net is drawn through the water by a boat, and means for holding the aerial normally in an inoperative position and causing it to assume an upright operative position when a signal is to be transmitted.

4. The combination of a net adapted to be submerged in the sea, a signal transmitter and an automatic controlling device for the signal transmitter consisting of a casing the parts of which are relatively movable, contacts on said parts adapted to be brought into engagement by the relative movement of the parts, and surfaces on said parts adapted to be acted upon by the water to cause relative movement of said parts when the automatic controlling device is drawn through the water with the net.

5. The combination of a net adapted to be submerged in the sea and a signal transmitter for transmitting a signal when the net is drawn through the water, said transmitter consisting of a buoyant casing, an aerial mounted thereon, a transformer within the casing connected to the aerial, a battery within the casing connected to the transformer, a circuit controller in one of the circuits of the transformer, means for operating the circuit controller and means for controlling the operation of the signal transmitter.

6. The combination of a net adapted to be submerged in the sea in position to be engaged by a submarine or other boat, an automatic controlling device connected to the net and arranged to close an electric circuit when it is drawn through the water by a boat which has engaged the net, and a wireless telegraph signal transmitter adapted to float when in use on the surface of the sea and provided with an aerial and with electrical connections to the aerial for sending out predetermined electrical impulses therefrom under the control of the said automatic controlling device.

7. The combination of a flexible barrier adapted to be submerged in the sea in position to be engaged and drawn through the water by a moving submarine or other boat, a wireless telegraph signal transmitter adapted to transmit a predetermined signal, a controller connected to the barrier to be towed thereby and adapted to be brought into action automatically during such towing movement, and connections between said controller and said transmitter for actuating the latter automatically from the former; substantially as described.

8. The combination of a flexible barrier adapted to be submerged in the sea in position to be engaged and drawn through the water by a moving submarine or other boat, a wireless telegraph signal transmitter adapted to transmit a predetermined signal, and controlling means connected to be towed by the barrier during its movement through the water and adapted to be automatically set in motion while being towed, so as to cause operation of the transmitter; substantially as described.

9. The combination of a flexible barrier adapted to be submerged in the sea in position to be engaged and drawn through the water by a moving submarine or other boat, a wireless telegraph signal transmitter adapted to transmit a predetermined signal, and a controller connected to the barrier to be towed thereby and comprising relatively-movable parts operable by the movement of the controller through the water to automatically bring said controller into action, so as to cause operation of the transmitter; substantially as described.

In testimony whereof I affix my signature.

GIOVANNI EMANUELE ELIA.